United States Patent [19]
Harris

[11] Patent Number: 5,367,327
[45] Date of Patent: * Nov. 22, 1994

[54] SINGLE PASS FULL COLOR PRINTING SYSTEM USING A QUAD-LEVEL XEROGRAPHIC UNIT AND A TRI-LEVEL XEROGRAPHIC UNIT WITH IMPROVED EXPOSURE OF THE PHOTORECEPTOR

[75] Inventor: Ellis D. Harris, Claremont, Calif.

[73] Assignee: Xerox Corporation, Stamford, Conn.

[ * ] Notice: The portion of the term of this patent subsequent to Jun. 22, 2010 has been disclaimed.

[21] Appl. No.: 170,947

[22] Filed: Dec. 21, 1993

[51] Int. Cl.$^5$ .................... G03G 15/01; G01D 15/14
[52] U.S. Cl. ......................................... 346/157; 346/160
[58] Field of Search ................................ 346/157, 160

[56] References Cited
U.S. PATENT DOCUMENTS

| | | | |
|---|---|---|---|
| 4,963,900 | 10/1990 | Budd et al. | 346/160 |
| 5,221,954 | 6/1993 | Harris | 346/157 X |
| 5,223,906 | 6/1993 | Harris | 346/157 X |

Primary Examiner—George H. Miller, Jr.
Attorney, Agent, or Firm—William Propp

[57] ABSTRACT

A four color toner single pass color printing system consists generally of a raster output scanner (ROS) optical system and a quad-level xerographic unit which will deposit blue, yellow or black toner and a tri-level xerographic unit which will deposit magenta or cyan toner. The yellow toner is transmissive to the red or infrared light from the raster output scanner (ROS) optical system to allow ease of exposure of the underlying photoreceptor. The resulting color printing system would be able to produce pixels of black and white and all six primary colors.

6 Claims, 2 Drawing Sheets

First Exposure – Developer Station Selects Yellow, Blue, Black or No Toner by Exposure Level in a Quad-Level Process

| EXPOSURE LEVEL | DEVELOPER OPTIONS | | | |
|---|---|---|---|---|
| 1 (MAX) | K | K | B | Y |
| 2 | B | Y | – | – |
| 3 | – | – | Y | B |
| 4 (MIN) | B | Y | K | K |

Second Exposure – Developer Station Selects Cyan, Magenta or No Toner by Exposure Level in a Tri-Level Process

| EXPOSURE LEVEL | DEVELOPER OPTIONS | |
|---|---|---|
| 1 (MAX) | C | M |
| 2 | – | – |
| 3 (MIN) | M | C |

*FIG. 2*

SINGLE PASS FULL COLOR PRINTING SYSTEM USING A QUAD-LEVEL XEROGRAPHIC UNIT AND A TRI-LEVEL XEROGRAPHIC UNIT WITH IMPROVED EXPOSURE OF THE PHOTORECEPTOR

BACKGROUND OF THE INVENTION

The present invention relates generally to a single pass full color printing system consisting generally of a raster output scanner (ROS) optical system and a quad-level xerographic unit and a tri-level xerographic unit in tandem, and more particularly, to a specific sequence of toners for such a single pass full color printing system which permits ease of exposure of the photoreceptor through toner already deposited upon the photoreceptor.

A single pass full color printing system can consist of a raster output scanner (ROS) optical system and a quad-level xerographic unit and a tri-level xerographic unit, as described in U.S. Pat. No. 5,221,954, commonly assigned to the same assignee as the present application and herein incorporated by reference. In that printing system, a photoreceptor belt is uniformly charged, then exposed to the first beam from the raster output scanner (ROS) optical system which produces four charge levels on the photoreceptor belt. The quad-level xerographic unit will then deposit toner of a first color, toner of a third color, toner of a combination of a second and the third color, or no toner upon the photoreceptor belt based upon the charge level. The photoreceptor belt is then recharged and re-exposed to a second beam from the raster output scanner (ROS) optical system which produces three new charge levels on the photoreceptor belt. The tri-level xerographic unit will then deposit toner of a fourth color, toner of a fifth color, or no toner upon the photoreceptor belt based upon the charge level. The colored toners upon the photoreceptor belt are then transferred to a sheet of material and fused to the sheet. The photoreceptor belt is then cleaned of residual toner and charges.

In the prior art reference, the colored toners of cyan and magenta are deposited upon the photoreceptor belt by the first xerographic unit. Red or infrared light is commonly used in xerographic systems to expose the photoreceptor belt to produce charges on the belt. It is difficult for the second red or infrared beam to pass through the already deposited cyan and magenta toners to expose the recharged photoreceptor belt so that the second xerographic unit can deposit further colored toners.

It is an object of this invention to provide a single pass full color printing system using a quad-level xerographic unit and a tri-level xerographic unit which permits ease of exposure of the photoreceptor through toner already deposited upon the photoreceptor.

SUMMARY OF THE INVENTION

In accordance with the present invention, a single pass full color printing system consists generally of a raster output scanner (ROS) optical system and a quad-level xerographic unit and a tri-level xerographic unit in tandem.

A full color printing system would be able to produce pixels of black and white and all six primary colors; red, green, blue, cyan, magenta and yellow. The quad-level xerographic unit will deposit blue, yellow and black toner while the tri-level xerographic unit will deposit magenta and cyan toner. Yellow toner from the first xerographic unit and magenta toner from the second xerographic unit will produce red. Yellow toner from the first xerographic unit and cyan toner from the second xerographic unit will produce green. The yellow toner is transmissive to the red or infrared light from the raster output scanner (ROS) optical system to allow ease of exposure of the underlying photoreceptor.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2 is tables showing the sequence of toners for the quad-level xerographic unit and a tri-level xerographic unit of the single pass full color printing system of FIG. 1 formed according to the present invention.

DESCRIPTION OF THE PREFERRED EMBODIMENT

Figure 1:
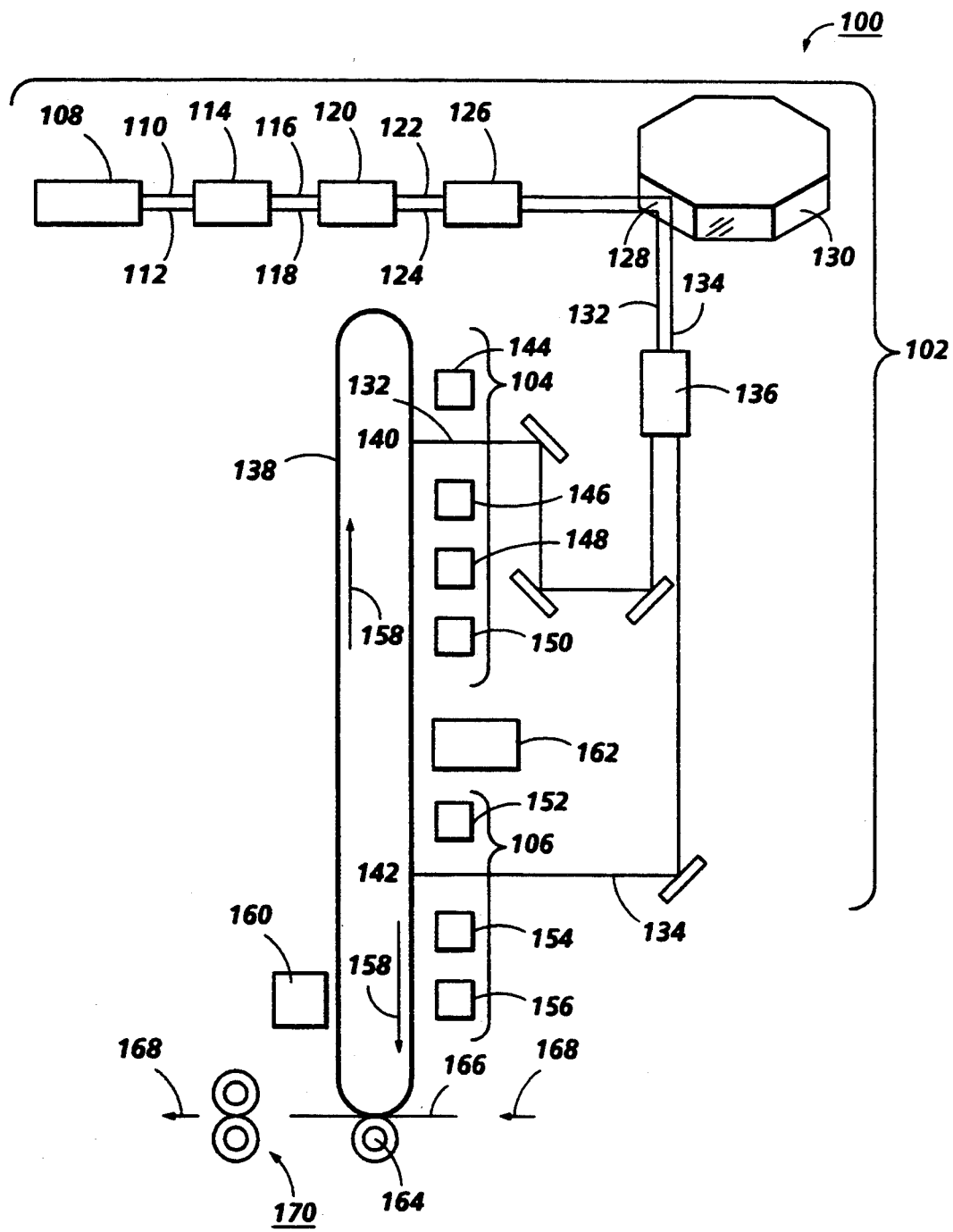
FIG. 1 is a schematic view of the single pass full color printing system using a quad-level xerographic unit and a tri-level xerographic unit formed according to the present invention.

Reference is now made to FIG. 1, wherein there is illustrated a single pass full color printing system 100. The color printing system 100 consists generally of a raster output scanner (ROS) optical system 102, a quad-level xerographic unit 104 and a tri-level xerographic unit 106.

In the raster output scanner 102, a light source 108 emits two coherent laser beams 110 and 112 which are collimated and otherwise conditioned by collimating optical element 114. The two collimated beams 116 and 118 are independently modulated by dual channel modulator 120. The two modulated beams 122 and 124 are re-collimated, further conditioned and focused by optical element 126 onto a facet 128 of a rotating multi-faceted polygon mirror 130. The reflected, modulated beams 132 and 134 are imaged and focused by f-theta imaging and distortion correction optical element 136 and reflected by folding mirrors onto the photoreceptor belt 138 at two separate locations 140 and 142.

The first beam 132 is focused at point 140 on the photoreceptor belt 138 between the charging station 144 and the first, second and third developer stations 146, 148 and 150 of the quad-level xerographic unit 104. The second beam 134 is focused at point 142 on the photoreceptor belt 138 between the charging station 152 and the first and second developer stations 154 and 156 of the tri-level xerographic unit 106.

The photoreceptor belt 138 moves in the direction of arrow 158 to advance successive portions of the belt sequentially through the various processing stations disposed about the path of the photoreceptor belt. The belt advances driven by rollers and motors and belt drives (not shown).

Initially, successive portions of the photoreceptor belt 138 pass through a cleaning station 160. The cleaning station removes any residual toner particles and any residual charges from the photoreceptor belt.

The belt 138 next advances through the charging station 144 of the quad-level xerographic unit 104. The charging station charges the belt to a selectively high uniform potential, $V_0$.

The charged belt is then exposed to the modulated light beam 132 from the raster output scanner (ROS) optical scanner, which causes the charged surface of the belt to be discharged in accordance with the modulated output of the beam 132. This results in four separate and different discharge and exposure levels; zero exposure, a low intermediate exposure, a high intermediate exposure and full exposure, which correspond to the four charge levels, as discussed in U.S. Pat. No. 5,221,954.

The photoreceptor belt 138 next passes through the first, second and third developer stations 146, 148 and 150 of the quad-level xerographic unit 104. The first developer housing 146 deposits the first toner (blue) upon portions or pixels of the photoreceptor belt 138 having the least exposure. The second developer housing 148 deposits the second toner (yellow) upon portions or pixels of the photoreceptor belt 138 having the highest intermediate exposure. The third developer housing 150 deposits the third toner (black) upon portions or pixels of the photoreceptor belt 138 having the most exposure and portions or pixels of the photoreceptor belt 138 having the highest intermediate exposure. No toner is deposited on the photoreceptor belt having low intermediate exposure. Thus, the quad-level xerographic unit 104 will produce resulting color images on the photoreceptor belt of the first toner, the third toner, the combination of the second and third toner, and no toner.

The photoreceptor belt may then advance through the erasure section 162 which removes any residual charges from the quad-level xerographic unit 104 on the photoreceptor belt. The erasure section does not remove, nor effect, any toner on the belt from the quad-level xerographic unit. The erasure section is optional since the charging station of the next xerographic unit will provide a uniform charge to the belt.

The belt 138 next passes through the charging station 152 of the tri-level xerographic unit 106. The charging station charges the belt to a selectively high uniform potential, $V_0$.

The charged belt is then exposed to the modulated light beam 134 from the raster output scanner (ROS) optical scanner, which causes the charged surface of the belt to be discharged in accordance with the modulated output of the beam 134. This results in three separate and different discharge and exposure levels; zero exposure, intermediate exposure and full exposure, as discussed in U.S. Pat. No. 5,221,954.

The photoreceptor belt 138 next passes through the first and second developer stations 154 and 156 of the tri-level xerographic unit 106. The first developer housing 154 deposits the fourth toner (magenta) upon portions or pixels of the photoreceptor belt 138 having zero exposure while the second developer housing 156 deposits the fifth toner (cyan) upon portions or pixels of the photoreceptor belt 138 having full exposure, as previously discussed. No toner is deposited on the photoreceptor belt having intermediate exposure, as previously discussed.

Toner from the developer housings of the second xerographic unit 106 (magenta or cyan) can be deposited on toner on the photoreceptor belt from the developer housings of the first xerographic unit 104 (yellow). Normally, the system will be configured to prevent depositing any toner from the second xerographic housing upon any toner from the first xerographic housing except yellow.

The photoreceptor belt 138 then advances through the transfer station 164. A sheet of support material 166 is moved into contact with the toner upon the photoreceptor belt 138 at the transfer station 164 to transfer the toner to the sheet 166. The toner deposited upon the belt and thus the toner transferred to the sheet would include toner from both xerographic units 104 and 106.

After transfer, the sheet 166 moves in the direction of arrow 168 which advances the sheet to fusing station 170. Fusing station 170 permanently affixes the transferred toner image to the sheet 166, as previously discussed.

After the toner is separated from the photoreceptor belt, the belt 138 then passes through the cleaning station 160 and the printing cycle is complete. The cleaning station removes any residual toner particles and any residual charges from the photoreceptor belt.

In the single pass full color printing system 100, toner from the second xerographic unit 106 (cyan or magenta) can be deposited on toner (yellow) previously deposited from the first xerographic unit 104 resulting in toner dot-upon-toner dot pixels on the photoreceptor belt and subsequently on the sheet of support material. The two or three toners from the same xerographic unit cannot, however, be deposited toner dot-upon-toner dot to produce a pixel on the photoreceptor belt.

Toner from the two developer housings of the second xerographic unit 106 can be deposited upon the same spot on the photoreceptor belt as toner deposited from the three developer housings of the first xerographic unit 104. These permutations allow toner of one color deposited on toner of another color to form a pixel of a different color on the photoreceptor.

A full process full color printing system would be able to produce pixels of black and white and all six primary colors; red, green, blue, cyan, magenta. Pixels of the additive primary colors of blue, red and green can be produced by toner dot upon toner dot of a combination of the three subtractive primary color toners. With the toner dots of the three subtractive primary colors and black without combination with other toner dots, the resulting eight pixels can then be assembled into a full color palette using pixel next to pixel.

In the single pass full color printing system 100 of the present invention, the first toner will be blue, the second toner will be black and the third toner will be yellow in the developer stations 146, 148 and 150 of the quad-level xerographic unit 104. The fourth toner will be magenta and the fifth toner will be cyan in the developer stations 154 and 156 of the tri-level xerographic unit 106.

A white pixel is produced by no toner being deposited on the photoreceptor belt 138 and the sheet of support material 166 being white. A blue pixel is produced by blue toner alone being deposited from the first xerographic unit. A yellow pixel is produced by yellow toner alone being deposited from the first xerographic unit. A magenta pixel is produced by magenta alone being deposited from the second xerographic unit. A cyan pixel is produced by cyan alone being deposited from the second xerographic unit.

A black pixel is produced by black toner being deposited from the first xerographic unit upon the yellow toner also from the first xerographic unit. The use of black toner in one of the developer stations of the xerographic units presents special circumstances other than the use of toners of any of the primary colors. Black deposited and combined with any other color will produce only black. Thus, black toner deposited on any color will also yield black.

A green pixel is produced by depositing yellow from the first xerographic unit and depositing cyan from the second xerographic unit on top of the yellow. A red pixel is produced by depositing yellow from the first xerographic unit and depositing magenta from the second xerographic unit on top of the yellow.

The color printing system 100 of the present invention would be able to produce pixels of black and white and all six primary colors; red, green, blue, cyan, magenta and yellow for full color.

The principal advantage of the color printing system of the present invention is the two toners, magenta and cyan, from the second xerographic unit 106 are only deposited upon the bare photoreceptor belt 138 or upon the yellow toner from the first xerographic unit 104 to achieve full color for the printing system. No toner from the second xerographic unit 106 is deposited upon either the blue toner nor the black toner from the first xerographic unit 104.

The photoreceptor belt 138 is recharged after exposure and deposition of toner from the first xerographic unit 104. The light source 108 will typically emit light in the red or infrared range. Thus, the second beam 134 is incident only upon the bare photoreceptor belt 138 or passes through the yellow toner deposited to be incident upon the photoreceptor belt to produce the charge levels upon the belt for the second xerographic unit 106. Yellow toner is transmissive to light in the red or infrared range. The difficulty of exposing the photoreceptor belt through other color toners is bypassed with the specific sequence of toners of blue, yellow and black in the first quad-level xerographic unit and toners of magenta and cyan is the second tri-level xerographic unit with a red or infrared light source from the raster output scanner (ROS) optical system.

As shown in the tables of FIG. 2, in the first exposure for the quad-level xerographic unit, the black (k) toner will be charged to be attracted to the maximum or minimum exposure level on the photoreceptor belt. The no (-) toner exposure can be either the low intermediate exposure level or the high intermediate exposure level on the photoreceptor belt. The yellow (y) and blue (b) toners can, alternately, be charged to be attracted to the remaining intermediate exposure level and the remaining maximum or minimum exposure level on the photoreceptor belt. The black toner and a colored toner will always be on the same side of the intermediate exposure level of no toner (white) from the other colored toner.

In the second exposure for the try-level xerographic unit, the magenta (m) and the cyan (c) toners can, alternately, be charged to be attracted to the maximum or minimum exposure level on the photoreceptor belt. The no (-) toner exposure will be the intermediate exposure level on the photoreceptor belt.

The hue of a color is the primary colors. The saturation of a color extends from the greyest to its most vivid color. The lightness of a color extends from black through a series of gradually lightening greys to white.

The human eye can not perceive the individual colored spots produced by the color printing system 100. The eye blurs clusters of color pixels together to discern a hue, saturation and lightness that it discerns as a color. Typically, depending upon the size of the individual spot, these pixels can be clustered in a 2 by 4 or a 3 by 3 matrix of individual pixels.

The individual pixels within the matrix can be the same color or different colors. If the individual spots are the same color, then that pixel will be of the strongest saturation of that color, the most vivid shade of that color. By having different colors for the pixels in the matrix, the saturation and hue of the pixel will vary.

By having the pixels in the matrix be exclusively from two adjacent colors in the spectrum, the resulting pixel matrix color will be along the hue boundary between the colors and of the strongest saturation. By having the pixels in the matrix be exclusively from two non-adjacent colors in the spectrum, the resulting pixel matrix color will be of varying hues and saturation. By having the pixels of the matrix be of three or more colors, the hue and saturation of the pixel matrix will vary.

The lightness and darkness of the color produced by the color printing system 100 is achieved by adding white or black color pixels to the matrix. For example, pink, or light red, is printed by having a pixel matrix of 50% red and 50% white.

In general, with regard to all the embodiments of the color printing systems, if the sheet of support material is not white, then a white toner may be used within the developer housings of the xerographic units.

If the first and second modulated beam have the same wavelength, then the color printing system has simpler modulator and optical elements which do not have to be calibrated for two wavelengths and an easier calculation of the optical paths of the two beams. The optical paths of the two beams should be the same length, although it is not impossible to have differing lengths for the optical paths. The dual channel modulator may be able to compensate for any difference in lengths of the optical paths.

The use of a dual beam light source with the two emitted beams sharing the same optical elements in the raster output scanner optical system provides improved pixel placement accuracy upon the photoreceptor belt since a common polygon facet is used. The use of quad-level and tri-level xerographic units also aids in pixel placement accuracy upon the photoreceptor belt since only two laser beams are needed to produce the full range of colors in a single pass. Optical beam alignment is vastly simplified compared to the use of many beams. Sharing the optical components also reduces the physical size, the number of optical elements and the costs of the single pass full color printing system.

However, the sharing of optical elements by the dual beams is merely an illustrative example of the color printing system. Two separate light sources could each emit a beam. Each beam could have a separate ROS optical system or just share certain ROS optical elements, like the facet of the rotating polygon mirror. A single light could emit a single beam which is split by beam splitting means anywhere along the ROS optical system, prior to the two xerographic units.

The photoreceptor belt of the present invention can, in the alternative, be a drum photoreceptor or other equivalents. The rotating polygon raster output scanner (ROS) optical system 102 can, in the alternative, be a LED image bar or other equivalents.

The light source 108, the collimating optical element 114 and the dual channel modulator 120 can be replaced by a diode laser which is modulated electronically.

There are alternate quad-level xerographic units for carrying out the desired formation of three different color pixels on the photoreceptor means of the present invention. Some of these alternatives, such as U.S. Pat.

No. 5,049,949, assigned to the same assignee as the present invention and herein incorporated by reference, do not use the combining of two color toners to form a third color pixel on the photoreceptor means, but rather directly deposit three different color toners upon the photoreceptor means without combination. It should be noted that these other quad-level xerographic units are equally applicable to the present invention.

Similarly, there are alternate tri-level xerographic units for carrying out the desired formation of two different color pixels on the photoreceptor means of the present invention, which are equally applicable to the present invention.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A single pass full color printing system comprising:
   a raster output scanner optical system for generating a first modulated beam and a second modulated beam,
   a photoreceptor means,
   a quad-level xerographic unit for charging said photoreceptor means, said photoreceptor means then being exposed to said first modulated beam, said quad-level xerographic unit having means for depositing a first blue color toner, a second black color toner, and a third yellow color toner on said photoreceptor means based on the charge, after exposure to said first modulated beam, and
   a tri-level xerographic unit for charging said photoreceptor means, subsequent to said quad-level xerographic unit, said photoreceptor means then being exposed to said second modulated beam, said tri-level xerographic unit having means for depositing a fourth magenta color toner and a fifth cyan color toner on said photoreceptor means based on the charge, after exposure to said second modulated beam, whereby said color toners produce pixels for black and white and all six primary colors.

2. The single pass full color printing system of claim 1 further comprising:
   said first modulated beam and second modulated beam being in the red or infrared light range.

3. The single pass full color printing system of claim 1 further comprising:
   means for transferring said toners upon said photoreceptor means onto a sheet of support material.

4. The single pass full color printing system of claim 1 further comprising:
   erasure means between said quad-level xerographic unit and said tri-level xerographic unit for removal of any residual charge on said photoreceptor means.

5. The single pass full color printing system of claim 1 wherein said photoreceptor means is a photoreceptor belt.

6. The single pass full color printing system of claim 1 wherein said photoreceptor means is a photoreceptor drum.

* * * * *